(12) United States Patent
Maruyama et al.

(10) Patent No.: US 8,303,853 B2
(45) Date of Patent: *Nov. 6, 2012

(54) METHOD OF PRODUCING A METALLIC NANOPARTICLE INORGANIC COMPOSITE, METALLIC NANOPARTICLE INORGANIC COMPOSITE, AND PLASMON WAVEGUIDE

(75) Inventors: Miho Maruyama, Kanagawa (JP); Kenji Todori, Kanagawa (JP); Tsukasa Tada, Tokyo (JP); Reiko Yoshimura, Kanagawa (JP); Yasuyuki Hotta, Tokyo (JP); Ko Yamada, Kanagawa (JP); Masakazu Yamagiwa, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 354 days.

This patent is subject to a terminal disclaimer.

(21) Appl. No.: 12/500,691

(22) Filed: Jul. 10, 2009

(65) Prior Publication Data
US 2010/0072420 A1    Mar. 25, 2010

(30) Foreign Application Priority Data
Sep. 24, 2008    (JP) .................... 2008-244659

(51) Int. Cl.
*H01B 1/02* (2006.01)
*H01B 1/08* (2006.01)
*H01B 1/22* (2006.01)
*B05D 3/04* (2006.01)

(52) U.S. Cl. ............ 252/514; 252/512; 252/518.1; 427/343; 427/331; 427/352; 427/344; 427/353; 427/419.1; 428/148

(58) Field of Classification Search .......... 252/512, 252/514, 518.1; 428/148; 427/343, 331, 427/352, 344, 353, 419.7
See application file for complete search history.

(56) References Cited

U.S. PATENT DOCUMENTS

| | | | | |
|---|---|---|---|---|
| 5,717,051 A * | 2/1998 | Hiraoka et al. | | 528/9 |
| 5,993,973 A * | 11/1999 | Lee et al. | | 428/433 |
| 6,515,631 B1 * | 2/2003 | Nakamura et al. | | 343/704 |
| 7,253,226 B1 * | 8/2007 | Ryang | | 524/492 |
| 7,469,083 B2 * | 12/2008 | Todori et al. | | 385/39 |
| 7,972,539 B2 * | 7/2011 | Maruyama et al. | | 252/512 |
| 2005/0051870 A1 * | 3/2005 | Yamazaki et al. | | 257/531 |
| 2006/0065902 A1 | 3/2006 | Todori et al. | | |
| 2006/0067602 A1 | 3/2006 | Todori et al. | | |
| 2006/0163556 A1 | 7/2006 | Yoshimura et al. | | |

(Continued)

OTHER PUBLICATIONS

S K Mandal et al., Surface plasmon resonance in nanocrystalline silver particles embedded in SiO2 matrix, J. Phys. D. Appl.Phys, vol. 35, (2002), pp. 2198-2205.*

(Continued)

*Primary Examiner* — Joseph D Anthony
(74) *Attorney, Agent, or Firm* — Turocy & Watson, LLP (57) ABSTRACT

A method using a chemical synthesis method to produce a metallic nanoparticle inorganic composite having fine metallic nanoparticles that are uniformly dispersed at a high density in a solidified matrix, a metallic nanoparticle inorganic composite, and a plasmon waveguide using this composite are provided. Thus, a method including: preparing a precursor solution, applying the precursor solution onto a substrate, and then hydrolyzing the precursor solution to form an oxide film having fine pores, bringing the oxide film into contact with an acidic aqueous solution of tin chloride to chemically adsorb $Sn^{2+}$ ions in the fine pores, removing an excess of the $Sn^{2+}$ ions, bringing the oxide film into contact with an aqueous metal chelate solution to precipitate metallic nanoparticles in the fine pores, and removing an excess of ions of the metal is provided.

8 Claims, 5 Drawing Sheets

U.S. PATENT DOCUMENTS

| | | | |
|---|---|---|---|
| 2006/0279833 | A1 | 12/2006 | Yoshimura et al. |
| 2007/0274664 | A1* | 11/2007 | van Veggel et al. ............ 385/142 |
| 2008/0107371 | A1 | 5/2008 | Todori et al. |
| 2008/0240652 | A1 | 10/2008 | Todori et al. |
| 2008/0241473 | A1* | 10/2008 | Maruyama et al. ............ 428/148 |
| 2008/0265414 | A1* | 10/2008 | Ho et al. ...................... 257/741 |
| 2009/0032781 | A1* | 2/2009 | Wang et al. ................. 252/521.2 |
| 2009/0291218 | A1* | 11/2009 | Huang ............................ 427/384 |
| 2010/0021104 | A1 | 1/2010 | Yamagiwa et al. |
| 2010/0028543 | A1* | 2/2010 | Davis et al. ................. 427/372.2 |
| 2010/0203454 | A1* | 8/2010 | Brongersma et al. ......... 430/311 |
| 2010/0276649 | A1 | 11/2010 | Maruyama et al. |

OTHER PUBLICATIONS

Peng Hiang et al., Preparation of Macroporous Metal Films from Colloidal Crystals, J. Am. Chem. Soc. (1999), vol. 121, pp. 7957-7958.*

Yoshio Kobayashi et al., Deposition of gold nanoparticles on silica sphers by electroless metal plating technique, Journal of Colloid and Interface Science, vol. 283, (2005), pp. 601-604.*

Yoshio Kobayashi et al., Deposition of silver Nanoparticles on Silica Spheres by Pretreatment Steps in Electroless Plating, Chem. Matter, vol. 13, (2001), pp. 1630-1633.*

Japanese Office Action dated Nov. 4, 2009, corresponding to U.S. Appl. No. 12/500,691, filed Jul. 10, 2009.

Zhang et al, Optical Properties of Au/SiO2 Nano-Composite Films Prepared by Induction-Coil-Coupled Plasma Sputtering, Materials Transactions, vol. 44, No. 2, 2003, pp. 215-219.

Japanese Office Action corresponding to U.S. Appl. No. 12/500,691 mailed on Aug. 18, 2009.

* cited by examiner

Absorption Spectra

METHOD OF PRODUCING A METALLIC NANOPARTICLE INORGANIC COMPOSITE, METALLIC NANOPARTICLE INORGANIC COMPOSITE, AND PLASMON WAVEGUIDE

CROSS-REFERENCE TO RELATED APPLICATION

This application is based upon and claims the benefit of priority from Japanese patent Application No. 2008-244659, filed on Sep. 24, 2008, the entire contents of which are incorporated herein by reference.

FIELD OF THE INVENTION

The present invention relates to a method for producing a metallic nanoparticle inorganic composite in which metallic nanoparticles are dispersed at a high density in a transparent oxide as a matrix, a metallic nanoparticle inorganic composite, and a plasmon waveguide using this metallic nanoparticle inorganic composite.

BACKGROUND OF THE INVENTION

A surface plasmon is an electromagnetic wave mode having properties of electric field localization and electric field enhancement. In recent years, the application research on the surface plasmon has been developed in diverse directions in nanotechnological and biotechnological fields. One field of the research is related to applications of a local surface plasmon. One of the applications is a plasmon polariton for transmitting light by use of metallic nanoparticles having a size in the nano order. For such applications, various methods for producing metallic nanoparticles have been studied. In order to make the signal intensity therefrom larger, studies have also been made for developing the structure thereof from a one-dimensional to a two-dimensional or three-dimensional structure.

In this field, the method for producing a metallic nanoparticle structure is most commonly electron beam lithography. For this technique, high-level CMOS technique and expensive device are essential. Additionally, it is basically difficult to produce a metallic nanoparticle three-dimensional structure.

Apart from the above-mentioned producing method using electron lithographic technique, studies have been actively made for producing metallic nanoparticles on the basis of chemical synthesis in order to produce metallic nanoparticles at lower cost. Examples of the studies include: a report showing that, in the Zsigmoddy method, which is a reduction method, the pH of a solution is rapidly changed in the reduction process so as to produce an Ag film of 10 to 20 nm thick uniformly on the surfaces of silica fine particles (80 to 180 nm), thereby producing Ag nano-shells; a report of putting silver particles into an aqueous gold chloride solution, and using the resultant as a reducing agent to produce Au shells on the surfaces of silver nanoparticles; and a report of using tin chloride as a reducing agent to produce silica spheres having surfaces on which silver nanoparticles are uniformly dispersed.

According to these chemical methods, metallic nanoparticles can be produced; however, the resultant samples are entirely in the form of a colloidal solution. When the particles are used as a device, it is necessary to make the particles into a solid form. However, in many researches, no study has been made on a process for dispersing nanoparticles in a transparent matrix without aggregating the nanoparticles.

As an intermediate technique between the above-mentioned inexpensive chemical synthesis methods and the highly accurate electron beam lithography, there is a technique of producing an Au-nanoparticle-dispersed $SiO_2$ film by co-sputtering of a metal, such as Au, and $SiO_2$, or some other method. According to this technique, an Au nanoparticle-dispersed composition can be three-dimensionally produced. In general, a large number of researches aim for nonlinear optical material using a local surface plasmon of Au or the like. A large amount of Au nanoparticles can be three-dimensionally incorporated into a transparent $SiO_2$ film; however, according to a mere sputtering of Au, the crystallinity of the Au nanoparticles is bad and the particles are not spherical. Therefore, after the formation of the film, it is necessary in many cases to subject the film to heating treatment at 500° C. or higher (B. Zhang, H. Masumoto, Y. Someno and T. Goto, "Optical Properties of Au/$SiO_2$ Nano-Composite Films Prepared by Induction-Coil-Coupled Plasma Sputtering", Mater. Trans., 44[2], (2003), pp. 215-219). Additionally, the uniformity of the particle diameters is not easily obtained due to the thermal treatment. Moreover, it is unavoidable that the particle diameters are increased by the aggregation of the particles when the particles are heated. As a result, it is also difficult to produce fine metallic nanoparticles each having a diameter as fine as 20 nm or less.

As described above, producing methods using electron beam lithography have a problem that production costs increase. Conventional chemical synthesis methods do not provide any technique of making metallic nanoparticles into a solid form. Additionally, according to the co-sputtering method, it is difficult to make metallic nanoparticles into fine sizes and realize an uniform and highly dense distribution of the particles in a matrix.

SUMMARY OF THE INVENTION

A method for producing a metallic nanoparticle inorganic composite according to an embodiment of the present invention includes: preparing a precursor solution wherein the molar ratio of HCl to a metal alkoxide is 0.2 or more and 1.0 or less; applying the precursor solution onto a substrate, and then hydrolyzing the precursor solution to form an oxide film having fine pores; bringing the oxide film into contact with an acidic aqueous solution of tin chloride to chemically adsorb $Sn^{2+}$ ions in the fine pores; removing an excess of the Sn2+ ions from the fine pores; bringing the oxide film into contact with an aqueous metal chelate solution to precipitate metallic nanoparticles in the fine pores; and removing an excess of ions of the aqueous metal chelate solution from the fine pores.

A metallic nanoparticle inorganic composite according to an embodiment of the present invention includes an oxide film which comprises at least one oxide selected from the group consisting of $SiO_2$, $B_2O_3$, $Al_2O_3$, $TiO_2$, $ZrO_2$, $Na_2O$, CaO and SrO and is transparent to visible rays, and metallic nanoparticles which are dispersed in the oxide film and contain at least one metal selected from the group consisting of Au, Ag, Cu, Pt, Pb, Ph, Cd, In and Pd, wherein the molar ratio of the oxide(s) to Cl in the oxide film is 200 or more and 500 or less.

The plasmon waveguide according to an embodiment of the present invention includes an oxide film which comprises at least one oxide selected from the group consisting of $SiO_2$, $B_2O_3$, $Al_2O_3$, $TiO_2$, $ZrO_2$, $Na_2O$, CaO and SrO and is transparent to visible rays, and metallic nanoparticles which are dispersed in the oxide film and contain at least one metal selected from the group consisting of Au, Ag, Cu, Pt, Pb, Ph, Cd, In and Pd, wherein the molar ratio of the oxide(s) to Cl in the oxide film is 200 or more and 500 or less.

DETAILED DESCRIPTION OF THE EMBODIMENTS

Embodiment 1

The method for producing a metallic nanoparticle inorganic composite according to a first embodiment of the present invention includes: preparing a precursor solution where the molar ratio of HCl to a metal alkoxide is 0.2 or more and 1.0 or less; applying the prepared precursor solution onto a substrate, and then hydrolyzing the precursor solution, thereby forming an oxide film having fine pores; bringing the formed oxide film into contact with an acidic aqueous solution of tin chloride, thereby precipitating $Sn^{2+}$ ions in the fine pores; removing an excess of the $Sn^{2+}$ ions from the fine pores; bringing the oxide film into contact with an aqueous metal chelate solution, thereby precipitating metallic nanoparticles in the fine pores; and removing an excess of ions of the aqueous metal chelate solution from the fine pores.

According to the present embodiment, it is possible to provide a method using a chemical synthesis method to produce a metallic nanoparticle inorganic composite having fine metallic nanoparticles that are uniformly dispersed at a high density in a solidified matrix.

The following will describe an example of the method for producing a metallic nanoparticle inorganic composite of the present embodiment, the example being a case in which the above-mentioned metallic alkoxide, oxide film and metal are TEOS (tetraethoxysilane), which is an organosilane, a $SiO_2$ film, and Ag, respectively. In the present specification, metallic nanoparticle inorganic composite refers to a composite material in which metallic nanoparticles are dispersed in an inorganic substance such as an oxide.

First, a precursor solution where the molar ratio of HCl to TEOS is 0.2 or more and 1.0 or less is prepared. The precursor solution is composed of water for causing hydrolysis of the metal alkoxide, which is to be an oxide, a catalyst for adjusting the hydrolysis and polycondensation reaction, and an organic solvent, such as an alcohol, which is to be a solvent for preparing a homogeneous solution.

In the preparation of this precursor solution, the molar ratio between hydrochloric acid and the metal alkoxide, which are necessary for producing a porous matrix in which metallic nanoparticles can stably be dispersed at a high concentration in an oxide, that is, the molar ratio of HCl/TEOS is 0.2 or more and 1.0 or less. If the ratio is less than 0.2, a probability that the precipitation of metallic nanoparticles is not caused stably is high. If the ratio is more than 1.0, the reaction advances vigorously so that the precursor solution is easily gelatinized. As a result, a film therefrom cannot be formed on the substrate.

In a case where it is supposed that this metallic nanoparticle inorganic composite is used as an on-chip optical interconnection, that is, a plasmon polariton waveguide, it is desired that the oxide film is a $SiO_2$ film, which is good in adaptability to materials surrounding the waveguide and the process, as exemplified herein. In terms of the efficiency of the plasma generation, the metallic nanoparticles are preferably Ag nanoparticles, which exhibit maximum generation efficiency, as exemplified herein.

The thus-prepared precursor solution may be applied onto a substrate made of quartz glass, Si or the like by dip coating, spin coating, or some other coating method, so as to form a film. After the formation of the film, it is desired that the film be kept at room temperature for 12 to 48 hours to advance hydrolysis and polycondensation gently. In this way, a $SiO_2$ film having fine pores is formed on the substrate. In the present embodiment, the film is formed by the sol-gel method, thereby making active use of an inevitably generated porous texture and precipitating Ag metallic nanoparticles inside the fine pores.

It is preferred to advance the hydrolysis and the polycondensation gently in order to densify the $SiO_2$ film formed on the substrate so as not to decrease the precipitation area. In a case where a $SiO_2$ film is formed in a short time, an oven or the like may be used; however, for the above-mentioned reason, the temperature for thermal treatment is preferably set to 80° C. or lower. In order to restrain the generation of cracks, it is preferred to use a humidified atmosphere.

In the thus-formed $SiO_2$ film, a residue resulting from the HCl catalyst is present. It is necessary for the porous matrix in which the metallic nanoparticles can stably be precipitated at a high concentration in the oxide that the concentration of Cl in this film is in a range of 200 or more and 500 or less in molar ration of $SiO_2$ to Cl. If the ratio is more than 500, an extra reaction is caused so that the precipitated amount of Ag or the like may be decreased. If the ratio is less than 200, the $SiO_2$ film formation reaction become unstable so that the pore volume of the film may be decreased, and as a result, there is a high possibility that a matrix in which the metallic nanoparticles cannot be precipitated at a high density is generated. The molar ratio of $SiO_2$/Cl is to be kept at the same value in the $SiO_2$ film that is a matrix of a finally produced metallic nanoparticle inorganic composite.

The pore diameter of the fine pores in the formed $SiO_2$ film is desirably 20 nm or less, more desirably 5 nm or less, and the fine pores are desirably developed into a three-dimensional network. When the film has such fine pores, a great number of finer metallic nanoparticles can be uniformly dispersed into the matrix.

After the formation of the $SiO_2$ film by the sol-gel method, $Sn^{2+}$ ions, which are to be a reducing agent, are chemically adsorbed onto inner walls of the fine pores in the $SiO_2$ film. The tin is supplied in the form of an aqueous solution prepared from tin chloride, tin chloride dihydrate or some other starting material. For greater chemical adsorption of tin chloride into the $SiO_2$ film and for providing a strong reducing power, the pH of the aqueous solution is set desirably to 3 or less, more desirably to 2 or less by adding trifluoroacetic acid, hydrochloric acid or the like sufficiently thereto. Under the condition that the pH is higher than 3, the efficiency of $Sn^{2+}$ ion generation is declined.

The $SiO_2$ film is immersed into the aqueous solution containing tin chloride so as to be brought into contact with the solution. If necessary, forcible immersion such as vacuum immersion is performed. This contact causes chemical adsorption of $Sn^{2+}$ ions.

Thereafter, the sample is washed with distilled water or the like to remove extra $Sn^{2+}$ ions and on the like from the fine pores in the $SiO_2$ film. In this specification, the "extra $Sn^{2+}$ ions" means $Sn^{2+}$ ions that have not been chemically adsorbed onto the $SiO_2$ film.

After the removal of the $Sn^{2+}$ ions, a metallic nanoparticle precipitating step is performed as follows: the oxide film is brought into contact with an aqueous metal chelate solution to precipitate metallic nanoparticles into the fine pores. A metal salt is dissolved into an aqueous solution, and then ammonia or the like is used for chelation of the metal. In this embodiment, silver nitride is dissolved into an aqueous solution, and then ammonia water is dropwise added thereto so as to produce an Ag chelate.

The sample, which has undergone the chemical adsorption of the $Sn^{2+}$ ions, is immersed into the aqueous solution containing the Ag chelate. The chemically adsorbed $Sn^{2+}$ ions function as a reducing agent to reduce the Ag ions of the Ag chelate. The reduced Ag is precipitated as Ag nanoparticles having a size of 20 nm or less in the fine pores in the $SiO_2$ film.

After the precipitation of the Ag nanoparticles, extra metal ions, such as Ag ions, are removed from the fine pores. For example, an excess of the treating solution is washed with distilled water or the like, and then the film is dried. The extra metal ions referred to herein mean metal ions that have not been precipitated as metal nanoparticles in the fine pores in the $SiO_2$ film.

According to the method for producing a metallic nanoparticle inorganic composite of the present embodiment, an Ag nanoparticle inorganic composite can be produced which contains a $SiO_2$ film, which is an oxide film transparent to visible rays, Ag nanoparticles dispersed in this oxide film, and a tin oxide ($SnO_2$) dispersed in $SiO_2$ described above, the molar ratio of $SiO_2$ to Cl in the $SiO_2$ film being 200 or more and 500 or less.

Figure 1:
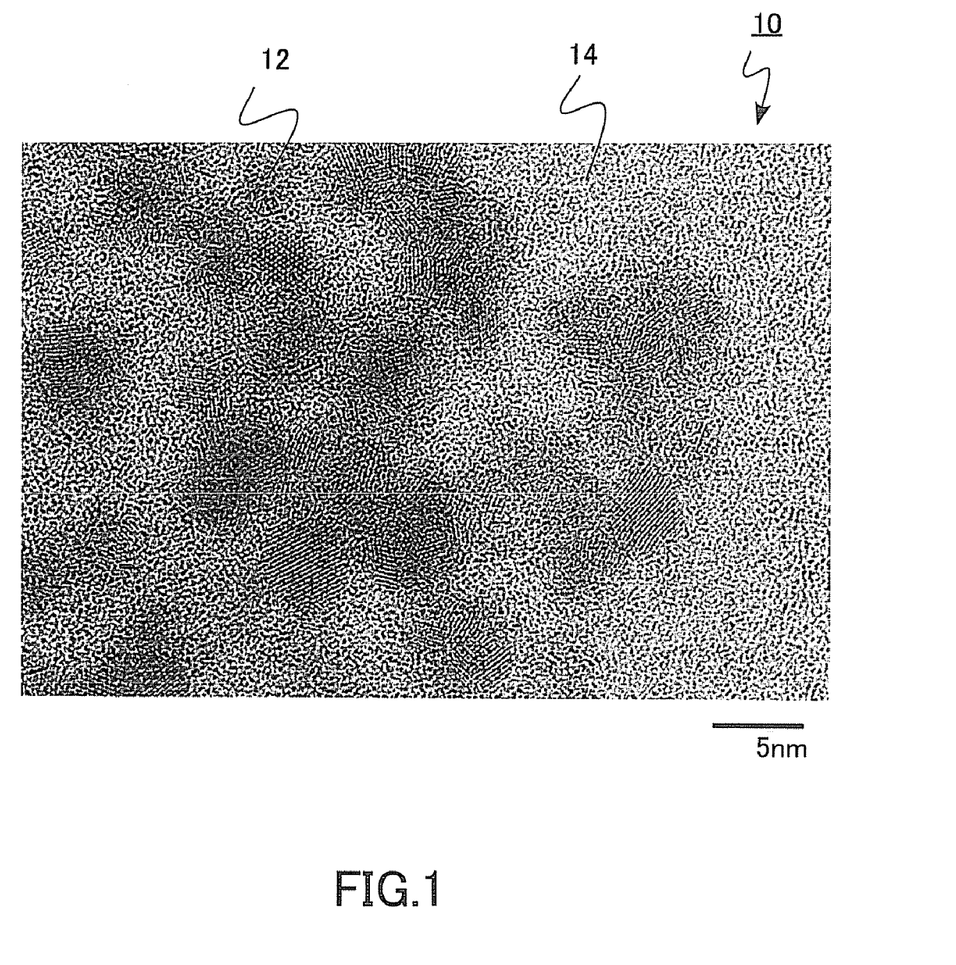
FIG. 1 is a TEM-observed image of a cross section of an Ag nanoparticle inorganic composite of a first embodiment.

FIG. 1 is a TEM-observed image of a cross section of an Ag nanoparticle inorganic composite produced by the producing method of the present embodiment. In the Ag nanoparticle inorganic composite 10, it can be seen that Ag nanoparticles 12 having a diameter of 20 nm or less are present at a high density in a $SiO_2$ matrix phase 14.

As described above, in an Ag nanoparticle inorganic composite where the molar ratio of $SiO_2$ to Cl in a $SiO_2$ film is 200 or more and 500 or less, out of Ag nanoparticle/$SiO_2$ matrix systems, the Ag nanoparticles are very fine and the composite includes a texture highly filled with Ag nanoparticles.

Such Ag nanoparticle inorganic composites can be verified to have clear plasmon absorption near 410 to 460 nm by optical property measurement. When an Ag nanoparticle inorganic composite of the present embodiment is produced on a prism and then the composite is measured by the ATR method, a gap is observed which results from the generation of plasmon polaritons and which has polarization dependency shifting toward shorter wavelengths with an increase in the incident angle of incident light. Namely, the composite can be suitably used for an optical device such as a plasmon waveguide or a nonlinear optical material.

In the method for producing a metallic nanoparticle inorganic composite of the present embodiment, the metal alkoxide is desirably TEOS, which is an organosilane, in order to improve the optical property of the produced metallic nanoparticle inorganic composite and make the metallic nanoparticles finer and more uniform. However, the metal alkoxide is not limited to TEOS, and may be any other metal alkoxide.

Moreover, the metal of the metallic nanoparticles is desirably Ag in order to improve the optical property of the produced metallic nanoparticle inorganic composite and make the metallic nanoparticles finer and more uniform. However, the metal is not limited to Ag, and may be Au, Cu, Pt, Pb, Ph, Cd, In, Pd or some other metal.

In the metallic nanoparticle inorganic composite of the present embodiment, the oxide that forms the oxide film is desirably $SiO_2$. However, the oxide is not limited to $SiO_2$, and maybe $Al_2O_3$, $TiO_2$, $ZrO_2$, $Na_2O$, CaO, any composite oxide containing two or more out of such oxides, or some other oxide. Such an oxide can be used as a matrix transparent to visible rays.

Embodiment 2

In a plasmon waveguide of a second embodiment of the invention, the metallic nanoparticle inorganic composite of the first embodiment is used as a waveguide. Accordingly, the description overlapping with those in the first embodiment will not be repeated.

Figure 2:
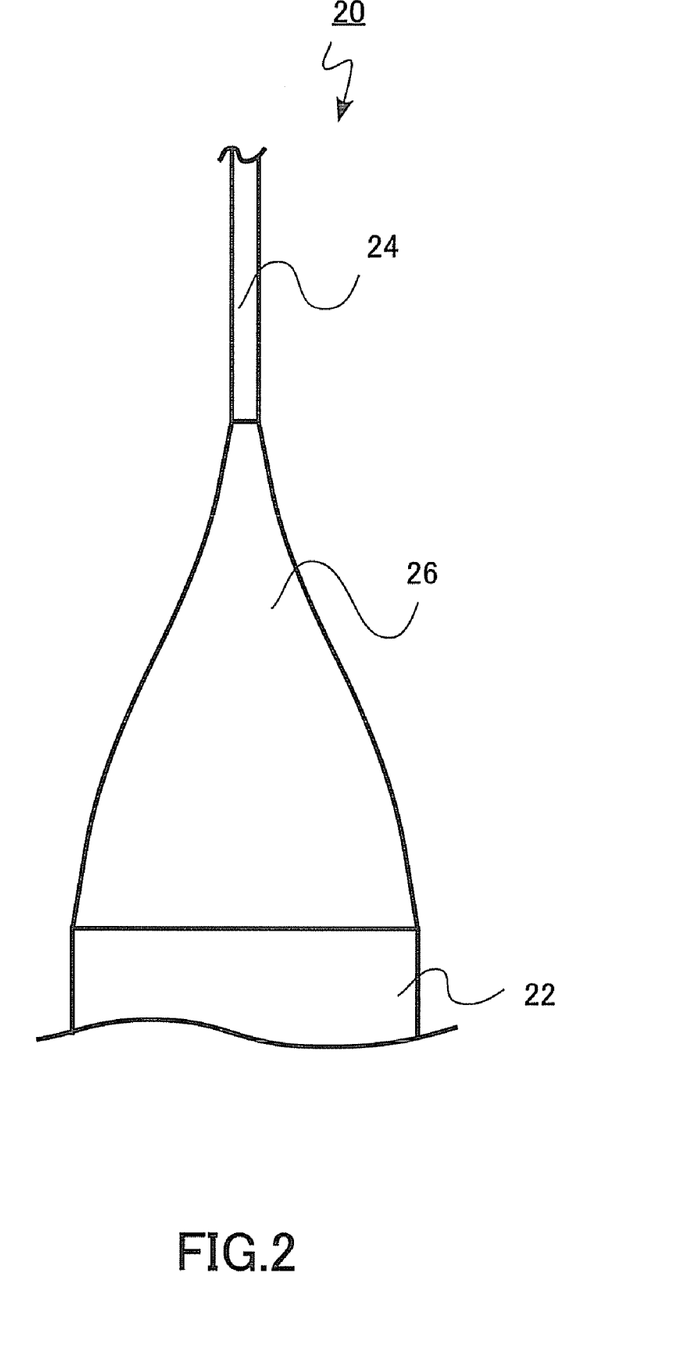
FIG. 2 is a plan view of a plasmon waveguide coupling device of a second embodiment.

FIG. 2 is a plan view of a plasmon waveguide coupling device using the plasmon waveguide of the present embodiment. The plasmon waveguide coupling device 20 has a propagating light waveguide 22, a plasmon waveguide 24, and a coupling region 26. Light is transmitted from the propagating light waveguide 22 through the coupling region 26 to the plasmon waveguide 24.

The material of the plasmon waveguide 24 may be the metallic nanoparticle inorganic composite of the first embodiment, for example, a metallic nanoparticle inorganic composite in which Ag nanoparticles are dispersed in a $SiO_2$ matrix.

The metallic nanoparticle inorganic composite of the first embodiment itself has excellent plasmon waveguide characteristics; therefore, the plasmon waveguide 24 of the present embodiment also realizes excellent plasmon waveguide characteristics. Additionally, the plasmon waveguide coupling device 20 using this plasmon waveguide 24 can make the efficiency of converting transmitted light to plasmons as high as possible.

The above has described some embodiments of the invention, referring to the specific examples. In the description of the embodiments, description is not made on parts, members and the like of the method for producing a metallic nanoparticle inorganic composite, the metallic nanoparticle inorganic composite, the plasmon waveguide and the others. Necessary elements related to the method for producing a metallic nanoparticle inorganic composite, the metallic nanoparticle inorganic composite, the plasmon waveguide and the others may be appropriately selected and used.

All modifications of the method for producing a metallic nanoparticle inorganic composite, the metallic nanoparticle in organic composite and the plasmon waveguide, which are obtained as a result of appropriate modification by those skilled in the art and which have the elements of the invention, are included in the scope of the invention. The scope of the invention is defined by the claims and equivalents thereto.

EXAMPLES

Examples of the invention will be described in detail below.

Example 1

A $SiO_2$ film was formed as an oxide film. TEOS and ethanol were selected as the raw material of $SiO_2$ and a solvent, respectively. 0.05 mol of TEOS and 1.37 mol of ethanol were prepared to prepare a 1-M solution thereof. Next, 0.5 mol of distilled water was prepared. HCl was used as an acid catalyst to prepare 2.02 g of a 36% aqueous solution of hydrochloric acid so that a composition where the ratio of HCl/TEOS was 0.4 could be prepared.

Distilled water was put into a beaker. Thereafter, ethanol and HCl were successively added thereto while the water was stirred. TEOS was finally added thereto, and the components were mixed for 4 hours. Initially, the generation of heat and water vapor resulting from the reaction was recognized; however, the temperature of the solution at the end of the mixing was normal.

The thus-produced precursor solution where the molar ratio of HCl/TEOS was 0.4 was applied on a quartz glass substrate of 20 mm×50 mm with a spinner to form an oxide film. The formed sample was kept at room temperature for 20 hours to cause hydrolysis and polycondensation reactions, thereby forming a $SiO_2$ film having fine pores.

Next, a tin treatment solution was produced. 0.1 g of tin chloride was dissolved in 20 mL of water, and then 0.1 mL of trifluoroacetic acid was added thereto. The components were then mixed for 5 minutes. 0.1 mL of the solution was added to 9.9 mL of ion exchange water. The above-mentioned $SiO_2$ film, which was a sample, was immersed in the produced treatment solution for about 1 hour to chemically adsorb $Sn^{2+}$ ions into the fine pores. Thereafter, the film was taken out from the treatment solution, and washed with ion exchange water to remove extra $Sn^{2+}$ ions.

Next, an Ag treatment solution was produced. 0.12 g of silver nitrate was dissolved into 20 mL of ion exchange water, and then 25% ammonia water was dropwise added thereto until the solution turned transparent. 0.1 mL of the solution was added to 9.9 mL of ion exchange water. The above-mentioned $SiO_2$ film was immersed in the produced treatment solution, which was an aqueous $Ag(NH_3)^{2+}$ chelate solution, for about 1 hour to precipitate Ag nanoparticles in the fine pores. Thereafter, the film was taken out from the treatment solution, and washed with ion exchange water to remove extra metal ions from the fine pores. Thereafter, the film was dried at room temperature for 24 hours.

As described above, an Ag nanoparticle-dispersed $SiO_2$ film in which the Ag nanoparticles were precipitated in the fine pores in the $SiO_2$ film was produced.

Figure 3:
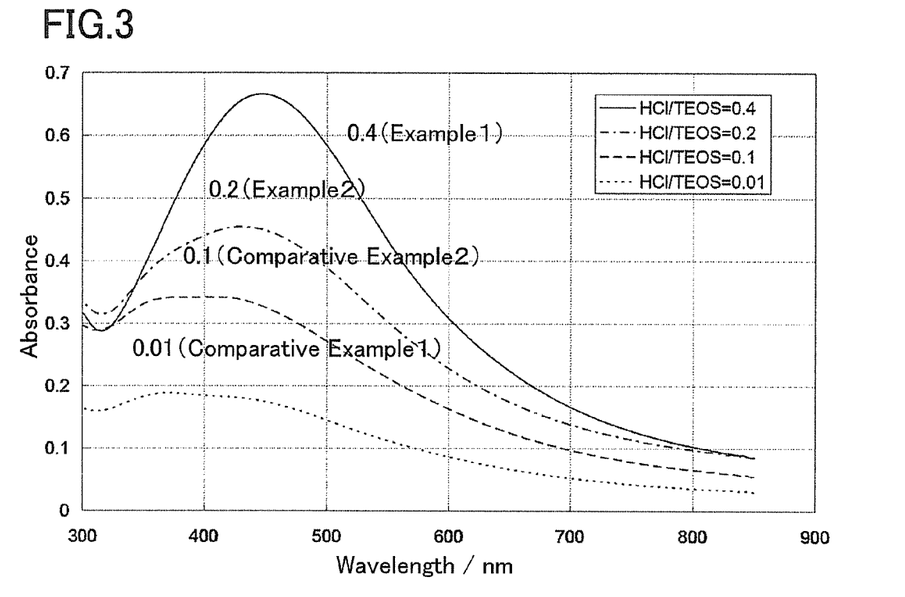
FIG. 3 is a graph showing measurement results of the absorbance of Examples and Comparative Examples.
Figure 4:
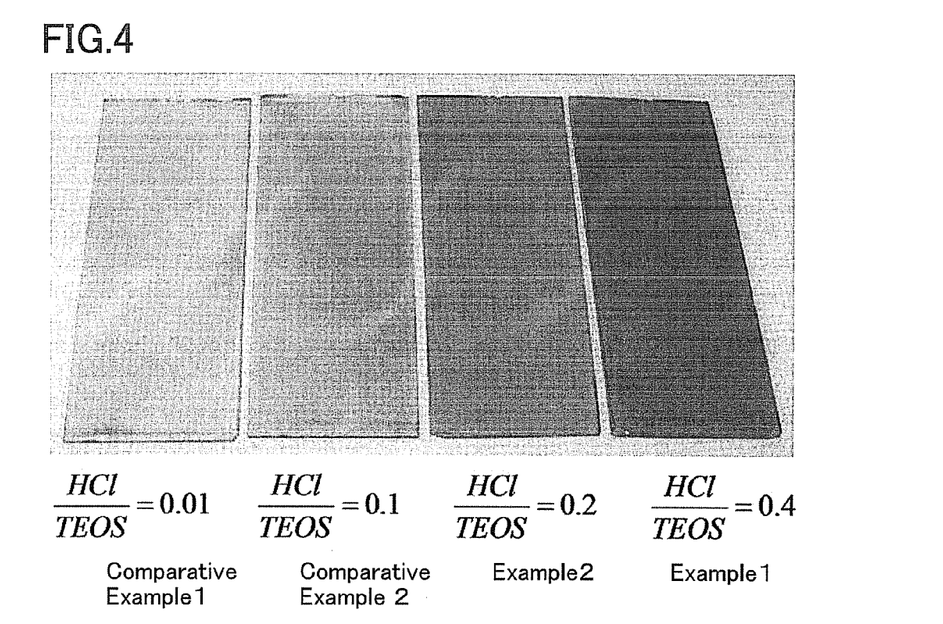
FIG. 4 is an external appearance view of samples of Examples and Comparative Examples.

The UV visible absorbance of the produced sample was measured using an absorptiometer (UV-2500 (PC) SGLP, manufactured by Shimadzu Corporation). The measurement result is shown in FIG. 3. The external appearance of the produced sample was observed. The result thereof is shown in FIG. 4.

Figure 5A:
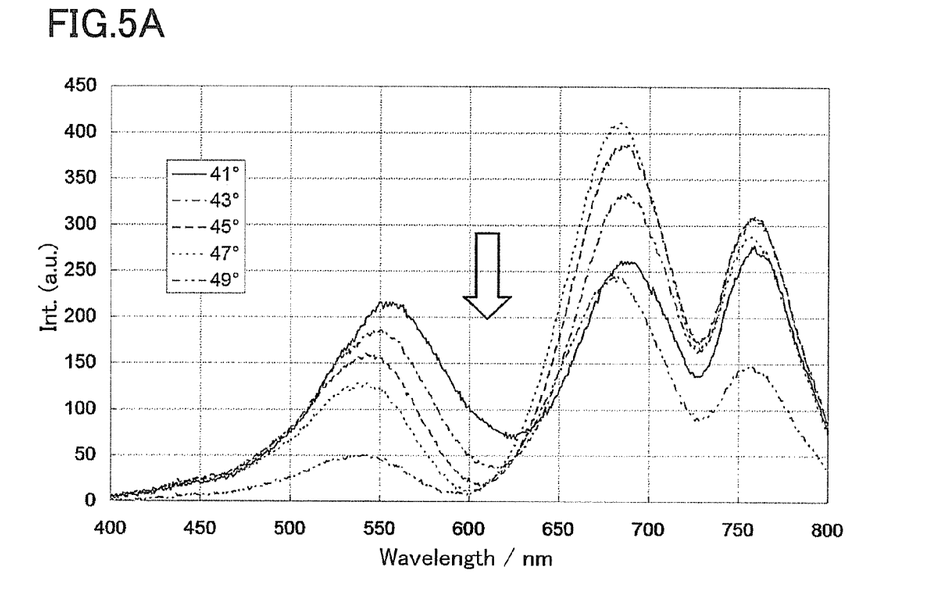
FIGS. 5A and 5B are graphs showing measurement results of Example by the ATR method.
Figure 5B:
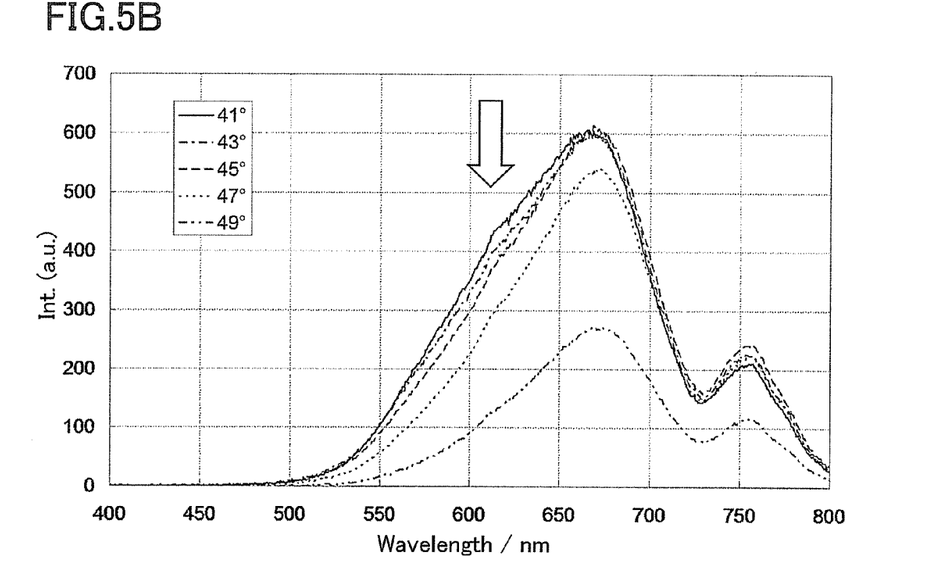

An Ag nanoparticle-dispersed $SiO_2$ film was formed on a prism in the same manner, and the resultant was measured by the so-called ATR method. The result thereof is shown in FIG. 5.

Example 2

An Ag nanoparticle-dispersed $SiO_2$ film was produced and evaluated in the same way as in Example 1 except that 1.01 g of a 36% aqueous solution of hydrochloric acid was prepared so that a composition where the ratio of HCl/TEOS was 0.2 could be prepared and the precursor solution where the molar ratio of HCl/TEOS was 0.2 was used. The result of absorbance measurement is shown in FIG. 3, and the result of external appearance observation is shown in FIG. 4. The result of the evaluation according to the ATR method will be described later.

Example 3

Figure 6:
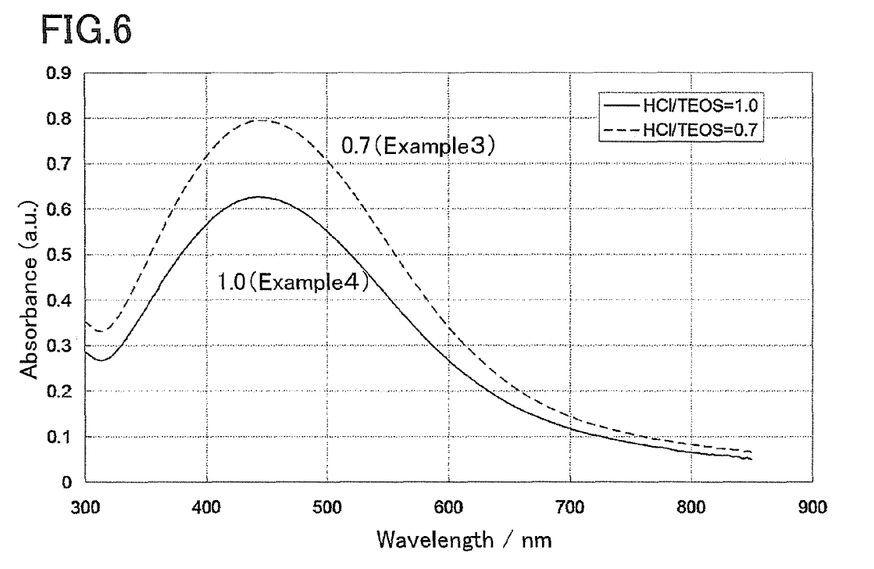
FIG. 6 is a graph showing measurement results of the absorbance of Examples.

An Ag nanoparticle-dispersed $SiO_2$ film was produced and the absorbance thereof was measured in the same way as in Example 1 except that a precursor solution where the molar ratio of HCl/TEOS was 0.7 was used. The result of absorbance measurement is shown in FIG. 6.

Example 4

An Ag nanoparticle-dispersed $SiO_2$ film was produced and the absorbance thereof was measured in the same way as in Example 1 except that a precursor solution where the molar ratio of HCl/TEOS was 0.1 was used. The result of absorbance measurement is shown in FIG. 6.

Comparative Example 1

An Ag nanoparticle-dispersed $SiO_2$ film was produced and evaluated in the same way as in Example 1 except that 0.5 mL of a 1-N aqueous solution of hydrochloric acid was prepared so that a composition where the ratio of HCl/TEOS was 0.01 could be prepared and the precursor solution where the molar ratio of HCl/TEOS was 0.01 was used. The result of absorbance measurement is shown in FIG. 3, and the result of external appearance observation is shown in FIG. 4. The result of the evaluation according to the ATR method will be described later.

Comparative Example 2

An Ag-nanoparticle-dispersed $SiO_2$ film was produced and evaluated in the same way as in Example 1 except that 5 mL of a 1-N aqueous solution of hydrochloric acid was prepared so that a composition where the ratio of HCl/TEOS was 0.1 could be prepared and the precursor solution where the molar ratio of HCl/TEOS was 0.1 was used. The result of absorbance measurement is shown in FIG. 3, and the result of external appearance observation is shown in FIG. 4. The result of the evaluation according to the ATR method will be described later.

As a result of the absorbance measurement of Ag nanoparticles, the plasmon absorption peak of the Ag nanoparticles appears near 410 to 460 nm, dependently on the diameter thereof. As shown in FIG. 3, for the samples of Comparative Examples 1 and 2, where the ratios of HCl/TEOS are 0.01 and 0.1, respectively, plasmon absorption peaks due to the Ag nanoparticles are recognized; however, the intensities thereof are lower than in the other two samples. Additionally, peaks having an intensity similar to that of the plasmon absorption peaks due to the Ag nanoparticles are present near 380 nm. Thus, the plasmon absorption peak is not a primary peak.

On the other hand, for the sample of Example 2, where the ratio of HCl/TEOS is 0.2, a plasmon absorption peak due to the Ag nanoparticles is clearly recognized and the intensity thereof is evidently higher than in Comparative Examples 1 and 2, where the ratios of HCl/TEOS are 0.01 and 0.1, respectively. Additionally, a peak near 380 nm is hardly recognized. Accordingly, the plasmon absorption peak is a primary peak.

For the sample of Example 1, where the ratio of HCl/TEOS is 0.4, only a plasmon absorption peak due to the Ag nanoparticles is clearly recognized, and the intensity thereof is the highest among the intensities of the four samples of Examples 1 and 2 and Comparative Examples 1 and 2. Additionally, no sign which appears to be a peak is recognized at all near 380 nm.

Also for the samples of Examples 3 and 4, where the ratios of HCl/TEOS are 0.7 and 1.0, respectively, only a plasmon absorption peak due to the Ag nanoparticles is clearly recognized, as shown in FIG. 6. Additionally, no sign which appears to be a peak is recognized at all near 380 nm.

FIG. 4 shows external appearances of the four produced samples of Examples 1 and 2 and Comparative Examples 1 and 4. It is evidently demonstrated that as the ratio of HCl is higher, the color of the samples tends to be deeper. Accordingly, it is understood that as the ratio of HCl is higher, the absorption of plasmons is more remarkable.

The results of measurement for Examples 1 and 2 and Comparative Examples 1 and 2 by the ATR method are as follows. For the samples of Comparative Examples 1 and 2, where the ratios of HCl/TEOS were 0.01 and 0.1, respectively, the generation of a gap having incident light angle dependency and polarization dependency, which resulted from the generation of plasmon polaritons was not observed. On the other hand, for the samples of Examples 2 and 1, where the ratios of HCl/TEOS were 0.2 and 0.4, respectively, the generation of a gap having incident light angle dependency and polarization dependency, which resulted from the generation of plasmon polaritons was observed.

The measurement result of the sample of Example 1, where the ratio of HCl/TEOS was 0.4, is shown in FIGS. 5. The result measured with p-polarized light is shown in FIG. 5A. The generation of a gap resulting from the generation of plasmon polaritons (at a position pointed by a white arrow outlined by a black line) was observed. This gap showed incident angle dependency, which is peculiar to the generation of plasmon polaritons and which is a dependency that the peak position is shifted as the incident angle of incident light is varied. The result measured with s-polarized light is shown in FIG. 5B. No gap was observed (at a position pointed by a white arrow outlined by a black line). Thus, it was confirmed that the gap seen in FIG. 5A was a polarization dependent gap resulting from the generation of plasmon polaritons.

Example 5

A $SiO_2$ film was formed as an oxide film. TEOS and ethanol were selected as the raw material of $SiO_2$ and a solvent, respectively. 0.1 mol of TEOS and 2.74 mol of ethanol were prepared to prepare a 1-M solution thereof. Next, 1.0 mol of distilled water was prepared. HCl was used as an acid catalyst to prepare 2.02 g of a 36% aqueous solution of hydrochloric acid so that a composition where the ratio of HCl/TEOS was 0.2 could be prepared.

Distilled water was put into a beaker. Thereafter, ethanol and HCl were successively added thereto while the water was stirred. TEOS was finally added thereto, and the components were mixed for 7 hours. In the same manner as in Example 1, initially, the generation of heat and water vapor resulting from the reaction was recognized; however, the temperature of the solution at the end of the mixing was normal.

The thus-produced precursor solution where the molar ratio of HCl/TEOS was 0.2 was applied on a quartz glass substrate of 20 mm×50mm with a spinner to form an oxide film. Two samples were produced in this way, one of which was used for composition analysis, and the other of which was used for Ag precipitating treatment.

The samples were kept at room temperature for 20 hours, and then Ag nanoparticles were precipitated into the fine pores in the same way as in Example 1 to produce Ag nanoparticle-dispersed $SiO_2$ films.

The absorbance of the produced sample was measured using an absorptiometer.

The $SiO_2$ film for composition-analysis was subjected to composition analysis using fluorescent X-rays.

Example 6

An Ag nanoparticle-dispersed $SiO_2$ film was produced and evaluated in the same way as in Example 5 except that 4.05 g of a 36% aqueous solution of hydrochloric acid was prepared so that a composition where the ratio of HCl/TEOS was 0.4 could be prepared and the precursor solution where the molar ratio of HCl/TEOS was 0.4 was used.

For the samples of Examples 5 and 6, an absorption peak resulting from plasmon absorption of the Ag nanoparticles was observed as a primary peak near 430 to 460 nm in the same manner as in Example 1. According to the results of the analysis of the $SiO_2$ film composition by means of the fluorescent X-rays, the molar ratio of $SiO_2$/Cl in the $SiO_2$ film was 440 in Example 5 and was 360 in Example 6.

Example 7

A $TiO_2$ film was formed as an oxide film. $Ti(iso\text{-}OC_3H_7)_4$ and ethanol were selected as the raw material of $TiO_2$ and a solvent, respectively. 0.05mol of $Ti(iso\text{-}OC_3H_7)_4$ and 1.37mol of ethanol were prepared to prepare a 1-M solution thereof. Next, 0.5 mol of distilled water was prepared. HCl was used as an acid catalyst to prepare 2.02 g of a 36% aqueous solution of hydrochloric acid so that the ratio of $HCl/Ti(iso\text{-}OC_3H_7)_4$ would be 0.4.

Distilled water was put into a beaker. Thereafter, ethanol and HCl were successively added thereto while the water was stirred. Ti ($iso\text{-}OC_3H_7$) 4 was finally added thereto, and the components were mixed for 6 hours. Initially, the generation of heat and water vapor resulting from the reaction was recognized; however, the temperature of the solution at the end of the mixing was normal.

The thus-produced precursor solution where the molar ratio of $HCl/Ti(iso\text{-}OC_3H_7)_4$ was 0.4 was used to form an oxide film on a quartz glass substrate of 20 mm×50 mm with a spinner.

The produced sample was kept at room temperature for 20 hours, and then Ag nanoparticles were precipitated into the fine pores in the same way as in Example 1. As a result, an Ag nanoparticle-dispersed $TiO_2$ film where Ag nanoparticles precipitated in the $TiO_2$ film was produced. The absorbance of the produced sample was measured using an absorptiometer. As a result, a peak resulting from plasmon absorption of the Ag nanoparticles was observed as a primary peak at about 440 nm.

Example 8

Films made of five composite oxides shown in Table 1 were produced as oxide films. Starting materials of each of the composite oxides are also shown in Table 1. HCl was used as an acid catalyst to prepare each 36% aqueous solution of hydrochloric acid so that the ratio of HCl/(the total of the metal alkoxides) would be about 0.3.

TABLE 1

| Composition | Ratio | Starting Materials | Plasmon absorption of Ag nanoparticles |
|---|---|---|---|
| $Al_2O_3$—$SiO_2$ | 50:50 | $Si(OC_2H_5)_4, Al(sec\text{-}OC_4H_9)_3$ | Observed |
| CaO—$SiO_2$ | 5:95 | $Si(OC_2H_5)_4, Ca(OC_2H_5)_2$ | Observed |
| $TiO_2$—$SiO_2$ | 8:92 | $Si(OC_2H_5)_4, Ti(iso\text{-}OC_3H_7)_4$ | Observed |

TABLE 1-continued

| Composition | Ratio | Starting Materials | Plasmon absorption of Ag nanoparticles |
|---|---|---|---|
| $Na_2O$—$SiO_2$ | 25:75 | $Si(OCH_3)_4$,$NaOCH_3$ | Observed |
| $ZrO_2$—$SiO_2$ | 5:95 | $Si(OC_2H_5)_4$,$Zr(OC_3H_7)_4$ | Observed |

Distilled water, an organic solvent such as ethanol, HCl, and the respective starting materials were put into a beaker and mixed for 6 to 12 hours while being stirred. The temperatures of all the precursor solutions at the end of the mixing were normal.

The thus-prepared precursor solutions were each used to form a film on a quartz glass substrate of 20 mm×50 mm with a spinner.

This formed samples were kept at room temperature for 20 hours, and then Ag metal nanoparticles were precipitated into the fine pores in the same way as in Example 1 to produce Ag nanoparticle composite oxide films.

The absorbance of the produced samples was measured using an absorptiometer. As a result, for each of the samples, peak resulting from plasmon absorption of the Ag nanoparticles was observed as a primary peak, as shown in Table 1.

Comparative Example 3

A $SiO_2$ film was formed as an oxide film. TEOS and ethanol were selected as the raw material of $SiO_2$ and a solvent, respectively. 0.025 mol of TEOS and 25 mL of ethanol were prepared to prepare a 1-M solution thereof. Next, 0.25 mol of distilled water was prepared. HCl was used as an acid catalyst to prepare 0.253 g of a 36% aqueous solution of hydrochloric acid so that the ratio of HCl/TEOS would be 0.1. Three samples were prepared in this way.

Distilled water was put into a beaker. Thereafter, ethanol and HCl were successively added thereto while the water was stirred. TEOS was finally added thereto, and the components were mixed for 5 hours. The thus-prepared precursor solutions where the ratio of HCl/TEOS was 0.1 were each used to form an oxide film on a quartz glass substrate of 20 mm×50 mm with a spinner.

The formed samples were kept at room temperature for 20 hours, and then Ag nanoparticles were precipitated into the fine pores in the same way as in Example 1. As a result, Ag nanoparticle-dispersed $SiO_2$ films were produced.

Figure 7:
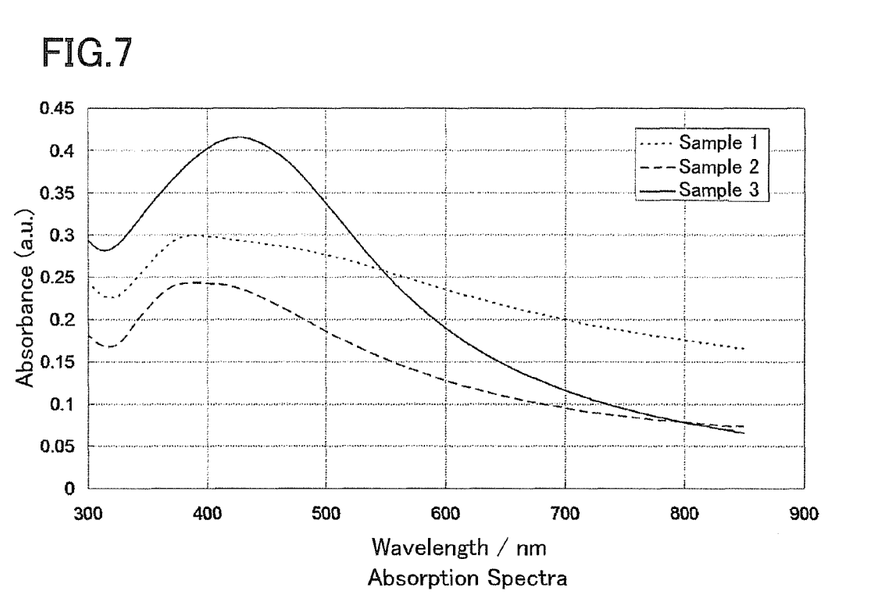
FIG. 7 is a graph showing measurement results of the absorbance of Comparative Example.

The absorbance of the three produced samples was measured using an absorptiometer. The measurement results are shown in FIG. 7. For one of the samples, only a plasmon absorption peak due to the Ag nanoparticles was observed. However, for the other two samples, not only a plasmon absorption peak due to the Ag nanoparticles but also a peak resulting from a reaction unintended in the present invention near 380 nm were present. Thus, the probability that an Ag nanoparticle-dispersed $SiO_2$ film in which Ag nanoparticles are dispersed at a high density was obtained was 1/3.

Example 9

As the material of the plasmon waveguide 24 of the plasmon waveguide coupling device 20 illustrated in FIG. 2, the metallic nanoparticle inorganic composite of Example 1 was used. The wavelength of light, the width of the propagating light waveguide 22 and the width of the plasmon waveguide 24 were set to 1 µm, 1 µm and 100 nm, respectively. The plasmon waveguide 24 was measured using a differential interference proximal field optical microscope. As a result, it was observed that plasmon waves were guided to the plasmon waveguide 24 with a coupling efficiency in the order of $10^{-2}$ when the plasmon waveguide 24 was coupled with the propagating light waveguide 22.

Comparative Example 4

As the material of the plasmon waveguide 24 of the plasmon waveguide coupling device 20 illustrated in FIG. 2, the metallic nanoparticle inorganic composite of Comparative Example 1 was used. The plasmon waveguide 24 was measured using a differential interference proximal field optical microscope. As a result, it was unsuccessful to observe that plasmon waves were guided.

Example 10

Ag nanoparticle-dispersed $SiO_2$ films were produced and evaluated in the same way as in Example 5 except that 7.072 g of a 36% aqueous solution of hydrochloric acid and 10.1 g of the same solution were prepared so that compositions where the molar ratios of HCl/TEOS were 0.7 and 1.0 could be prepared, respectively, and the precursor solutions where the molar ratios of HCl/TEOS were 0.7 and 1.0, respectively, were used.

For both of the samples, an absorption peak resulting from plasmon absorption of the Ag nanoparticles was observed as a primary peak near 430 to 460 nm. According to the results of the analysis of the $SiO_2$ film compositions by means of the fluorescent X rays, the molar ratio of $SiO_2$/Cl in the $SiO_2$ film was 340 in the sample where the ratio of HCl/TEOS was 0.7, and was 280 in the sample where the ratio of HCl/TEOS was 1.0.

It has been made clear from the Examples and Comparative Examples that the use of the invention makes it possible to produce a texture in which metallic nanoparticles are dispersed, without being aggregated, at a high density in a film of a transparent ceramic. It has also been made clear that a metallic nanoparticle inorganic composite having such a texture exhibits plasmon absorption characteristics and thus the composite is a structure suitable for being used as an optical device such as a plasmon waveguide.

What is claimed is:

1. A metallic nanoparticle inorganic composite, comprising:
    an oxide film which comprises at least one oxide selected from the group consisting of $SiO_2$, $B_2O_3$, $Al_2O_3$, $TiO_2$, $ZrO_2$, $Na_2O$, CaO and SrO and is transparent to visible rays, and
    metallic nanoparticles which are dispersed in the oxide film and contain at least one metal selected from the group consisting of Au, Ag, Cu, Pt, Pb, Ph, Cd, In and Pd,
    wherein the molar ratio of the oxide(s) to Cl in the oxide film is 200 or more and 500 or less.

2. The composite according to claim 1, wherein the oxide film is a $SiO_2$ film, and the metallic nanoparticles are Ag nanoparticles.

3. The composite according to claim 1, comprising a tin oxide dispersed in the oxide film.

4. A plasmon waveguide, comprising:
    an oxide film which comprises at least one oxide selected from the group consisting of $SiO_2$, $B_2O_3$, $Al_2O_3$, $TiO_2$, $ZrO_2$, $Na_2O$, CaO and SrO and is transparent to visible rays, and metallic nanoparticles which are dispersed in the oxide film and contain at least one metal selected from the group consisting of Au, Ag, Cu, Pt, Pb, Ph, Cd, In and Pd, wherein the molar ratio of the oxide(s) to Cl in the oxide film is 200 or more and 500 or less.

5. The plasmon waveguide according to claim 4, wherein the oxide film is a $SiO_2$ film, and the metallic nanoparticles are Ag nanoparticles.

6. The plasmon waveguide according to claim 4, further comprising a tin oxide dispersed in the oxide film.

7. The composite according to claim 1, wherein the oxide film has fine pores, the fine pores being developed into three-dimensional network and the metallic nanoparticles are precipitated in the fine pores.

8. The plasmon waveguide according to claim 4, wherein the oxide film has fine pores, the fine pores being developed into three-dimensional network and the metallic nanoparticles are precipitated in the fine pores.

* * * * *